US 11,463,118 B2

(12) United States Patent
Tada et al.

(10) Patent No.: US 11,463,118 B2
(45) Date of Patent: Oct. 4, 2022

(54) RADIO FREQUENCY MODULE AND COMMUNICATION DEVICE

(71) Applicant: Murata Manufacturing Co., Ltd., Nagaokakyo (JP)

(72) Inventors: Masaki Tada, Nagaokakyo (JP); Isao Takenaka, Nagaokakyo (JP)

(73) Assignee: MURATA MANUFACTURING CO., LTD., Nagaokakyo (JP)

( * ) Notice: Subject to any disclaimer, the term of this patent is extended or adjusted under 35 U.S.C. 154(b) by 0 days.

(21) Appl. No.: 17/204,963

(22) Filed: Mar. 18, 2021

(65) Prior Publication Data

US 2021/0306015 A1   Sep. 30, 2021

(30) Foreign Application Priority Data

Mar. 25, 2020   (JP) .............................. JP2020-054222

(51) Int. Cl.
*H04B 1/04* (2006.01)
*H04B 1/00* (2006.01)

(52) U.S. Cl.
CPC ........... *H04B 1/0458* (2013.01); *H04B 1/006* (2013.01); *H04B 1/0078* (2013.01); *H04B 2001/0408* (2013.01)

(58) Field of Classification Search
CPC .... H04B 1/0458; H04B 1/006; H04B 1/0078; H04B 1/04; H04B 1/0483; H04B 1/16; H04B 1/38; H04B 1/40
See application file for complete search history.

(56) References Cited

U.S. PATENT DOCUMENTS

| 10,404,219 | B2* | 9/2019 | Wallis ....................... H03F 3/72 |
| 2009/0128254 | A1* | 5/2009 | Goi ....................... H04B 1/0067 |
| | | | 333/101 |
| 2012/0306716 | A1* | 12/2012 | Satake ..................... H04B 1/44 |
| | | | 343/876 |
| 2013/0222045 | A1* | 8/2013 | Wu ..................... H01L 23/3675 |
| | | | 257/E29.345 |
| 2015/0133067 | A1 | 5/2015 | Chang et al. |
| 2017/0302236 | A1* | 10/2017 | Oshita ....................... H03F 3/72 |
| 2021/0119649 | A1* | 4/2021 | Kang ................... H04B 1/0064 |

FOREIGN PATENT DOCUMENTS

| KR | 10-2016-0100796 A | 8/2016 |
| KR | 10-2019-0086774 A | 7/2019 |
| WO | 2019/244815 A | 12/2019 |

OTHER PUBLICATIONS

Korean Office Action dated Nov. 25, 2021 in Korean Application No. 10-2021-0027147.

* cited by examiner

*Primary Examiner* — Tuan Pham
(74) *Attorney, Agent, or Firm* — Xsensus LLP (57) ABSTRACT

A radio frequency module includes: a plurality of external connection terminals including at least one input terminal and at least one output terminal; at least one power amplifier; at least one low-noise amplifier; a first switch connected between the at least one input terminal and the at least one power amplifier; a second switch connected between the at least one output terminal and the at least one low-noise amplifier; and a module substrate including a first principal surface and a second principal surface on opposite sides of the module substrate. The first switch is disposed on one of the first principal surface and the second principal surface, and the second switch is disposed on the other of the first principal surface and the second principal surface.

19 Claims, 6 Drawing Sheets

RADIO FREQUENCY MODULE AND COMMUNICATION DEVICE

CROSS-REFERENCE TO RELATED APPLICATION

The present application is based on and claims priority of Japanese Patent Application No. 2020-054222 filed on Mar. 25, 2020. The entire disclosure of the above-identified application, including the specification, drawings and claims is incorporated herein by reference in its entirety.

TECHNICAL FIELD

The present disclosure relates to a radio frequency module and a communication device.

BACKGROUND

In mobile communication apparatuses such as a mobile phone, the arrangement configuration of circuit elements included in radio frequency front-end circuits is becoming complex, particularly with developments in multiband technologies.

US Patent Application Publication No. 2015/0133067 discloses a radio frequency circuit including a power amplifier, a switch, a filter, etc.

SUMMARY

Technical Problems

However, as recognized by the present inventor, when packaging of a radio frequency module in which the radio frequency circuit disclosed by PTL 1 is downsized, a decrease in distance between components disposed on a module substrate likely causes electric field coupling, magnetic field coupling, or electromagnetic field coupling, etc. between the components. As a result, there is a possibility that the isolation characteristics between the components would be reduced, and the electrical characteristics (e.g., a noise figure (NF)) of the radio frequency module would deteriorate.

In view of the above, and other problems with conventional devices, the present disclosure provides a radio frequency module and a communication device that can be downsized while reducing (or suppressing) deterioration of electrical characteristics.

Solutions

A radio frequency module according to one aspect of the present disclosure includes: a plurality of external connection terminals including at least one input terminal and at least one output terminal; at least one power amplifier; at least one low-noise amplifier; a first switch connected between the at least one input terminal and the at least one power amplifier; a second switch connected between the at least one output terminal and the at least one low-noise amplifier; and a module substrate including a first principal surface and a second principal surface on opposite sides of the module substrate. The first switch is disposed on one of the first principal surface and the second principal surface, and the second switch is disposed on the other of the first principal surface and the second principal surface.

Advantageous Effects

A radio frequency module according to one aspect of the present disclosure can be downsized while reducing deterioration of electrical characteristics.

BRIEF DESCRIPTION OF DRAWINGS

These and other advantages and features will become apparent from the following description thereof taken in conjunction with the accompanying Drawings, by way of non-limiting examples of embodiments disclosed herein.

DESCRIPTION OF EMBODIMENTS

Hereinafter, exemplary embodiments of the present disclosure will be described in detail with reference to the drawings. It should be noted that each of the subsequently described exemplary embodiments shows a generic or specific example. The numerical values, shapes, materials, elements, the arrangement and connection of the elements, etc. indicated in the following exemplary embodiments are mere examples, and there are not intended to limit the present disclosure.

It should be noted that the drawings are schematic diagrams in which emphasis, omission, or ratio adjustment has been applied where necessary to illustrate the present disclosure. The drawings are thus not necessarily exact illustration of the present disclosure, and may illustrate shapes, positional relationships, and ratios differently from the actual ones. In the figures, elements that are substantially the same are given the same reference signs, and overlapping description may be omitted or simplified.

In the figures, the x-axis and the y-axis are orthogonal to each other on a plane parallel to a principal surface of a module substrate. In addition, the z-axis is vertical to the principal surface of the module substrate, and a positive direction of the z-axis indicates am upper direction and a negative direction of the z-axis indicates a downward direction.

In a circuit configuration of the present disclosure, "connected" means not only a case where elements are directly connected via a connection terminal and/or a wiring conductor but also a case where elements are electrically connected via another circuit element. In addition, "connected between A and B" means connected to both A and B between A and B.

In a component layout of the present disclosure, "a plan view of a module substrate" means viewing an object from a z-axis positive side by orthographic projection of the object onto the x-y plane. Moreover, "A is disposed between B and C" means that at least one of line segments joining an arbitrary point in B and an arbitrary point in C passes through A. Furthermore, terms indicating a relationship between elements such as "parallel" and "vertical" mean not only expressions with strict meanings but also expressions with meanings including substantially the same range, for example, an error of several percent.

Embodiment 1

[1.1 Circuit Configurations of Radio Frequency Module 1 and Communication Device 5]

Figure 1:
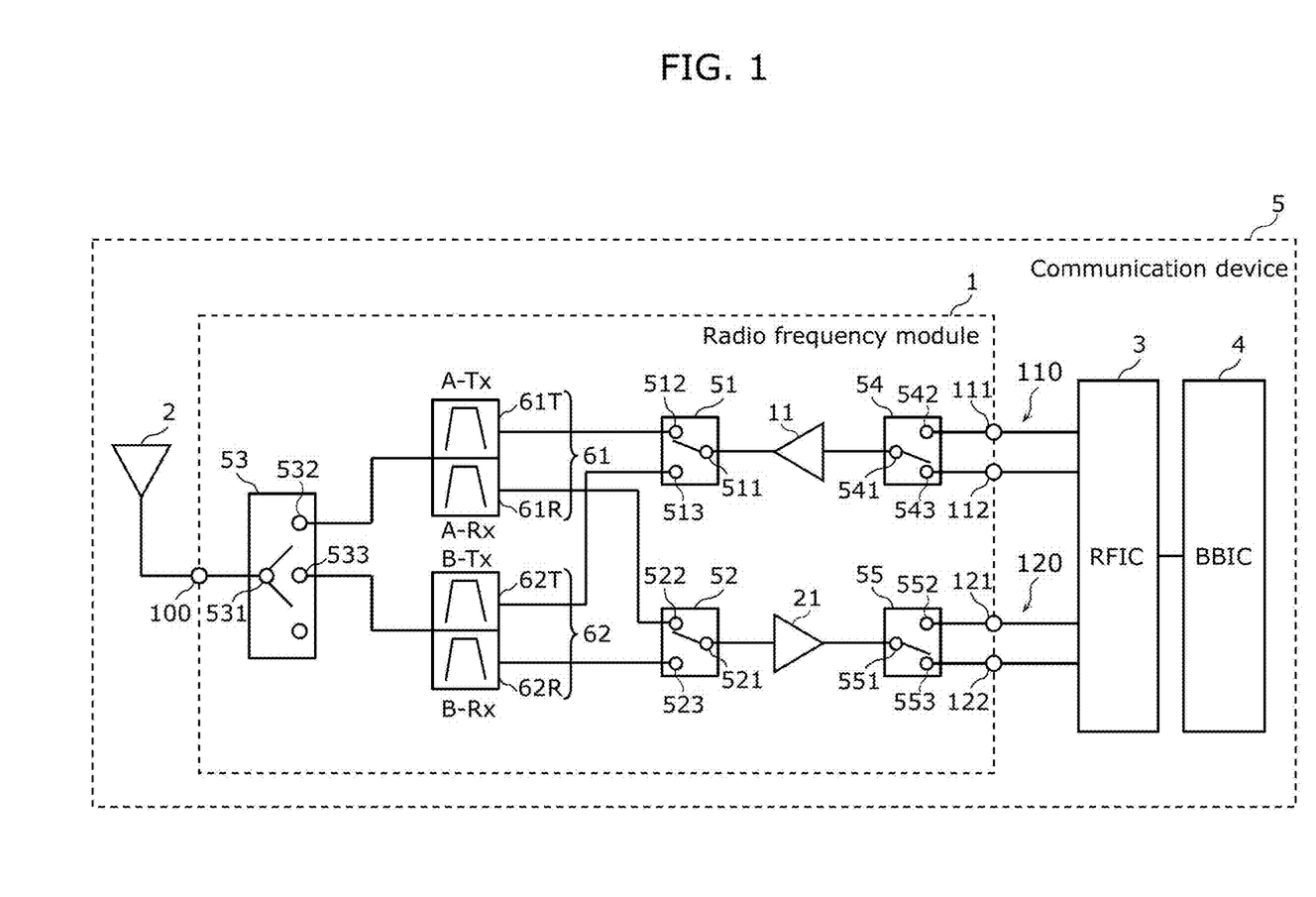
FIG. 1 is a circuit configuration diagram of a radio frequency module (or RF front-end circuitry) and a communication device according to Embodiment 1.

Circuit configurations of radio frequency module 1 and communication device 5 according to the present embodiment will be described with reference to FIG. 1. FIG. 1 is a circuit configuration diagram of radio frequency module 1 and communication device 5 according to Embodiment 1.

[1.1.1. Circuit Configuration of Communication Device 5]

First, the circuit configuration of communication device 5 will be described. As shown by FIG. 1, communication device 5 according to the present embodiment includes radio frequency module 1, antenna 2, radio frequency processing circuit (RFIC) 3, and baseband signal processing circuit (BBIC) 4.

Radio frequency module 1 transfers a radio frequency signal between antenna 2 and RFIC 3. The detailed circuit configuration of radio frequency module 1 will be described later.

Antenna 2 is connected to antenna connection terminal 100 of radio frequency module 1, transmits a radio frequency signal outputted from radio frequency module 1, and receives a radio frequency signal from the outside and outputs the radio frequency signal to radio frequency module 1.

RFIC 3 is an example of a signal processing circuit that processes a radio frequency signal. Specifically, RFIC 3 performs, by downconversion etc., signal processing on a radio frequency reception signal inputted via a reception path of radio frequency module 1, and outputs the reception signal generated by the signal processing to BBIC 4. Moreover, RFIC 3 performs, by upconversion etc., signal processing on a transmission signal inputted from BBIC 4, and outputs the radio frequency transmission signal generated by the signal processing to a transmission path of radio frequency module 1. Furthermore, RFIC 3 includes a controller that controls switches, amplifiers, etc of radio frequency module 1. It should be noted that part or all of the functionality as the controller of RFIC 3 may be implemented outside RFIC 3. For example, part or all of the functionality may be implemented in BBIC 4 or radio frequency module 1.

BBIC 4 is a baseband signal processing circuit that performs signal processing using an intermediate frequency band having a lower frequency than a radio frequency signal transferred by radio frequency module 1. A signal processed by BBIC 4 is used as, for example, an image signal for image display and/or a sound signal for communication via a speaker.

It should be noted that antenna 2 and BBIC 4 are not essential elements of communication device 5 according to the present embodiment.

[1.1.2. Circuit Configuration of Radio Frequency Module 1]

Next, the circuit configuration of radio frequency module 1 will be described. As shown by FIG. 1, radio frequency module 1 includes power amplifier 11, low-noise amplifier 21, switches 51 to 55, duplexers 61 and 62, antenna connection terminal 100, radio frequency input terminals 110, and radio frequency output terminals 120.

Antenna connection terminal 100 is an example of an external connection terminal and is connected to antenna 2.

Radio frequency input terminals 110 are each an example of the external connection terminal, and are terminals for receiving radio frequency transmission signals from outside radio frequency module 1. In the present embodiment, radio frequency input terminals 110 include first input terminal 111 and second input terminal 112.

First input terminal 111 is a terminal for receiving a first radio frequency transmission signal from RFIC 3. For example, a Fifth Generation New Radio (5G NR) transmission signal can be used as the first radio frequency transmission signal. The present embodiment, however, is not limited to this example. A 5G NR transmission signal is an uplink signal that a terminal transmits to a base station in accordance with NR that is a radio access technology (RAT) for the fifth generation mobile communication system (5G) developed by the $3^{rd}$ Generation Partnership Project (3GPP).

Second input terminal 112 is a terminal for receiving a second radio frequency transmission signal from RFIC 3. For example, a Long-Term Evolution (LTE) transmission signal can be used as the second radio frequency transmission signal. The present embodiment, however, is not limited to this example. An LTE transmission signal is an uplink signal that a terminal transmits to a base station in accordance with LTE standardized by 3GPP.

It should be noted that the number of radio frequency input terminals 110 is not limited to two. For example, radio frequency input terminals 110 may include three or more input terminals.

Radio frequency output terminals 120 are each an example of the external connection terminal, and are terminals for supplying radio frequency reception signals to the outside of radio frequency module 1. In the present embodiment, radio frequency output terminals 120 include first output terminal 121 and second output terminal 122.

First output terminal 121 is a terminal for supplying a first radio frequency reception signal to RFIC 3. For example, a 5G NR reception signal can be used as the first radio frequency reception signal. The present embodiment, however, is not limited to this example. A 5G NR reception signal is a downlink signal that a terminal receives from a base station in accordance with 5G NR.

Second output terminal 122 is a terminal for supplying a second radio frequency reception signal to RFIC 3. For example, an LTE reception signal can be used as the second radio frequency reception signal. The present embodiment, however, is not limited to this example. An LTE reception signal is a downlink signal that a terminal receives from a base station in accordance with LTE.

It should be noted that the number of radio frequency output terminals 120 is not limited to two. For example, radio frequency output terminals 120 may include three or more output terminals.

Power amplifier 11 is capable of amplifying radio frequency signals received by radio frequency input terminals 110. Specifically, power amplifier 11 is capable of amplifying radio frequency signals in communication bands A and B inputted via switch 54 from first input terminal 111 and second input terminal 112. The configuration of power amplifier 11 is not particularly limited. For example, power amplifier 11 may be a multistage amplifier, or an amplifier that converts a radio frequency signal into a differential signal and amplifies the differential signal.

Low-noise amplifier 21 is capable of amplifying radio frequency signals received by antenna connection terminal 100. Specifically, low-noise amplifier 21 is capable of amplifying radio frequency signals in communication bands A and B inputted via switch 53, duplexers 61 and 62, and switch 52 from antenna connection terminal 100. Radio frequency signals amplified by low-noise amplifier 21 are outputted via switch 55 to radio frequency output terminals 120. The configuration of low-noise amplifier 21 is not particularly limited.

Duplexer 61 passes radio frequency signals in communication band A. Duplexer 61 transfers transmission signals and reception signals in communication band A using frequency-division duplexing (FDD). Duplexer 61 includes transmission filter 61T and reception filter 61R.

Transmission filter 61T is connected between power amplifier 11 and antenna connection terminal 100. Transmission filter 61T passes, among the radio frequency transmission signals amplified by power amplifier 11, signals in a transmission bandwidth of communication band A. In other words, transmission filter 61T has a passband including the transmission bandwidth of communication band A.

Reception filter 61R is connected between low-noise amplifier 21 and antenna connection terminal 100. Reception filter 61R passes, among the radio frequency reception signals inputted from antenna connection terminal 100, signals in a reception bandwidth of communication band A. In other words, reception filter 61R has a passband including the reception bandwidth of communication band A.

Duplexer 62 passes radio frequency signals in communication band B. Duplexer 62 transfers transmission signals and reception signals in communication band B using FDD. Duplexer 62 includes transmission filter 62T and reception filter 62R.

Transmission filter 62T is connected between power amplifier 11 and antenna connection terminal 100. Transmission filter 62T passes, among the radio frequency transmission signals amplified by power amplifier 11, signals in a transmission bandwidth of communication band B. In other words, transmission filter 62T has a passband including the transmission bandwidth of communication band B.

Reception filter 62R is connected between low-noise amplifier 21 and antenna connection terminal 100. Reception filter 62R passes, among the radio frequency reception signals inputted from antenna connection terminal 100, signals in a reception bandwidth of communication band B. In other words, reception filter 62R has a passband including the reception bandwidth of communication band B.

Switch 51 is connected between transmission filters 61T and 62T and power amplifier 11. Specifically, switch 51 includes terminals 511, 512, and 513. Terminal 511 of switch 51 is connected to power amplifier 11. Terminals 512 and 513 of switch 51 are connected to transmission filters 61T and 62T, respectively. In this connection configuration, switch 51 is capable of connecting one of terminals 512 and 513 to terminal 511, based on a control signal from RFIC 3, for example. To put it another way, switch 51 is capable of switching between connecting power amplifier 11 and transmission filter 61T and connecting power amplifier 11 and transmission filter 62T. Switch 51 is configured of, for example, a single pole double throw (SPDT) switch circuit and is referred to as a band selection switch.

Switch 52 is connected between reception filters 61R and 62R and low-noise amplifier 21. Specifically, switch 52 includes terminals 521, 522, and 523. Terminal 521 of switch 52 is connected to low-noise amplifier 21. Terminals 522 and 523 of switch 52 are connected to reception filters 61R and 62R, respectively. In this connection configuration, switch 52 is capable of connecting one of terminals 522 and 523 to terminal 521, based on a control signal from RFIC 3, for example. To put it another way, switch 52 is capable of switching between connecting low-noise amplifier 21 and reception filter 61R and connecting low-noise amplifier 21 and reception filter 62R. Switch 52 is configured of, for example, an SPDT switch circuit.

Switch 53 is connected between antenna connection terminal 100 and duplexers 61 and 62. Specifically, switch 53 includes terminals 531, 532, and 533. Terminal 531 of switch 53 is connected to antenna connection terminal 100. Terminals 532 and 533 of switch 53 are connected to duplexers 61 and 62, respectively. In this connection configuration, switch 53 is capable of connecting one or both of terminals 532 and 533 to terminal 531, based on a control signal from RFIC 3, for example. In other words, switch 53 is capable of switching between connecting and disconnecting antenna 2 and duplexer 61, and switching between connecting and disconnecting antenna 2 and duplexer 62. Switch 53 is configured of, for example, a multi-connection switch circuit and is referred to as an antenna switch.

Switch 54 is an example of a first switch and is connected between radio frequency input terminals 110 and power amplifier 11. Specifically, switch 54 includes terminals 541, 542, and 543. Terminal 541 of switch 54 is connected to power amplifier 11. Terminals 542 and 543 of switch 54 are connected to first input terminal 111 and second input terminal 112, respectively. In this connection configuration, switch 54 is capable of connecting one of terminals 542 and 543 to terminal 541, based on a control signal from RFIC 3, for example. In other words, switch 54 is capable of switching between connecting first input terminal 111 and power amplifier 11 and connecting second input terminal 112 and power amplifier 11. Switch 54 is configured of, for example, an SPDT switch circuit and is referred to as a transmission input switch.

Switch 55 is an example of a second switch and is connected between radio frequency output terminals 120 and low-noise amplifier 21. Specifically, switch 55 includes terminals 551, 552, and 553. Terminal 551 of switch 55 is connected to low-noise amplifier 21. Terminals 552 and 553 of switch 55 are connected to first output terminal 121 and second output terminal 122, respectively. In this connection configuration, switch 55 is capable of connecting one of terminals 552 and 553 to terminal 551, based on a control signal from RFIC 3, for example. In other words, switch 55 is capable of switching between connecting first output terminal 121 and low-noise amplifier 21 and connecting second output terminal 122 and low-noise amplifier 21. Switch 55 is configured of, for example, an SPDT switch circuit and is referred to as a reception output switch.

It should be noted that radio frequency module 1 need not include some of the circuit elements shown by FIG. 1. For example, radio frequency module 1 may include at least power amplifier 11, low-noise amplifier 21, switches 54 and 55, radio frequency input terminals 110, and radio frequency output terminals 120. Radio frequency module 1 need not include the other circuit elements.

The circuit configuration of radio frequency module 1 makes it possible to communicate transmission signals and reception signals using FDD. A circuit configuration of a radio frequency module according to the present disclosure is not limited to this example. For example, the radio frequency module according to the present disclosure may include a circuit configuration that makes it possible to communicate transmission signals and reception signals using time-division duplexing (TDD), or may include a circuit configuration that makes it possible to communication transmission signals and reception signals using both FDD and TDD.

[1.2 Component Layout of Radio Frequency Module 1]

Next, the component layout of radio frequency module 1 thus configured will be described in detail with reference to FIG. 2 and FIG. 3.

Figure 2:
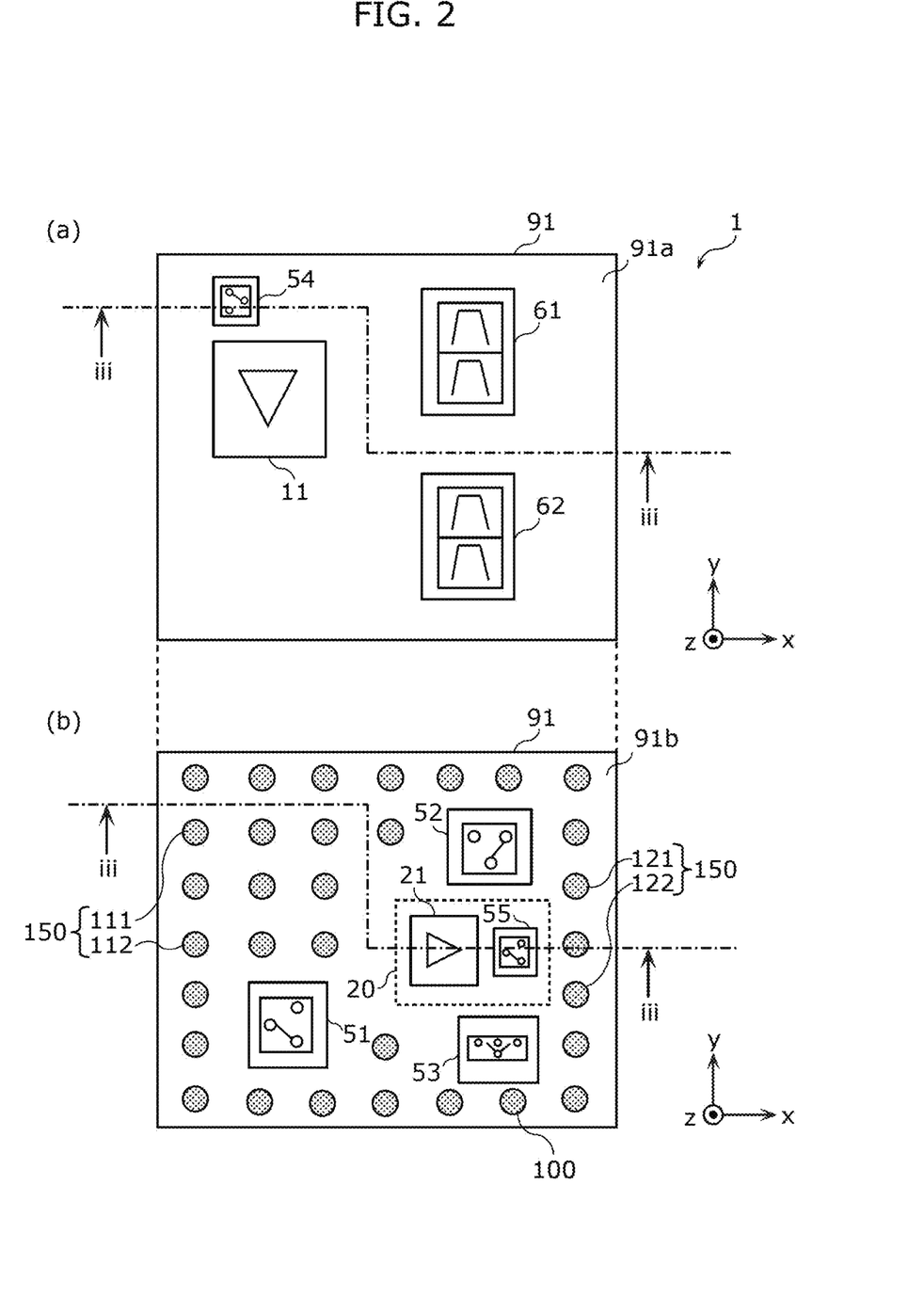
FIG. 2 is a plan view of the radio frequency module according to Embodiment 1.

FIG. 2, includes associated sub-figures (a) and (b), and is a plan view of radio frequency module 1 according to Embodiment 1, where the plan view is provided from two perspectives. Moreover, in FIG. 2, (a) shows principal surface 91a of module substrate 91 seen from the z-axis positive side, and (b) shows principal surface 91b of module substrate 91 seen from the z-axis positive side. FIG. 3 is a cross-sectional view of radio frequency module 1 according to Embodiment 1. The cross section of radio frequency module 1 in FIG. 3 is a cross section along line iii-iii in FIG. 2.

Figure 3:
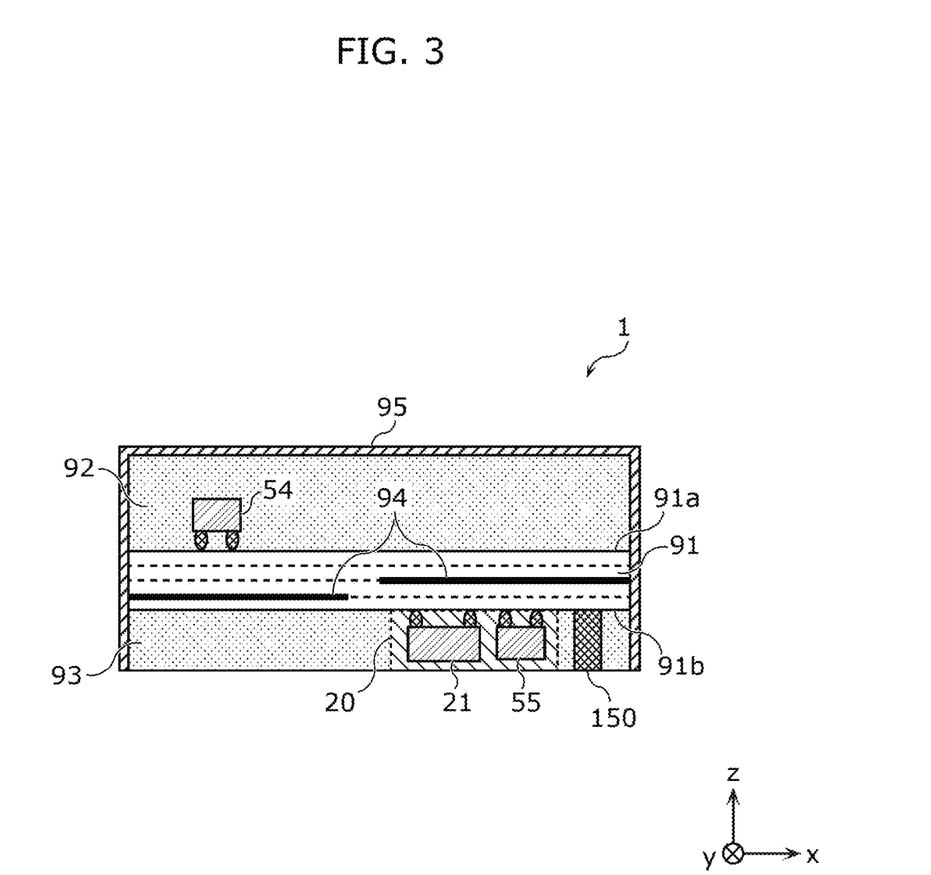
FIG. 3 is a cross-sectional view of the radio frequency module according to Embodiment 1.

As shown by FIG. 2 and FIG. 3, radio frequency module 1 further includes module substrate 91, resin components 92 and 93, ground electrode pattern 94, and shield electrode layer 95 in addition to circuit components containing the circuit elements shown by FIG. 1. Moreover, radio frequency module 1 includes post electrodes 150 as external connection terminals. It should be noted that resin components 92 and 93 and shield electrode layer 95 are omitted from FIG. 2.

Module substrate 91 includes principal surface 91a and principal surface 91b on opposite sides of module substrate 91. Examples of module substrate 91 include a low temperature co-fired ceramic (LTCC) substrate having a layered structure of dielectric layers, a high temperature co-fired ceramic (HTCC) substrate, a component-embedded substrate, a substrate having a redistribution layer (RDL), a printed substrate, or the like. The present embodiment, however, is not limited to these examples.

Principal surface 91a is an example of a first principal surface and may be referred to as an upper surface or a front surface. As shown by (a) in FIG. 2, power amplifier 11, switch 54, and duplexers 61 and 62 are disposed on principal surface 91a.

Each of duplexers 61 and 62 may be, for example, one of a surface acoustic wave filter, an acoustic wave filter using bulk acoustic waves (BAWs), an LC resonance filter, and a dielectric filter. Besides, duplexes 61 and 62 are not limited to these examples.

Principal surface 91b is an example of a second principal surface and may be referred to as a lower surface or a rear surface. As shown by (b) in FIG. 2, low-noise amplifier 21 and switches 51, 52, 53, and 55 are disposed on principal surface 91b.

Low-noise amplifier 21 and switch 55 are implemented in same semiconductor device 20. Semiconductor device 20 is also referred to as a semiconductor integrated circuit, and is an electronic component in which electronic circuits are provided on the surface of and inside a semiconductor chip (also referred to as a die). Semiconductor device 20 may be configured of, for example, a complementary metal-oxide-semiconductor (CMOS), and may be specifically configured using a silicon on insulator (SOI) structure. This makes it possible to manufacture semiconductor device 20 at low cost. It should be noted that semiconductor device 20 may include at least one of GaAs, SiGe, or GaN. This makes it possible to achieve high-quality semiconductor device 20.

Switches 51, 52, and 53 are not implemented in semiconductor device 20 and are disposed separately on principal surface 91b. It should be noted that switch 51, 52, or 53, or any combination of these may be implemented in semiconductor device 20.

Resin component 92 is disposed on principal surface 91a of module substrate 91, and covers the circuit components on principal surface 91a. Moreover, resin component 93 is disposed on principal surface 91b of module substrate 91, and covers the circuit components on principal surface 91b. Resin components 92 and 93 have a function of ensuring reliability such as mechanical strength and moisture resistance of the circuit components on principal surfaces 91a and 91b.

Ground electrode pattern 94 is provided in module substrate 91 and is disposed between switches 54 and 55. For example, ground electrode pattern 94 is a plane ground pattern connected to ground post electrodes included in post electrodes 150. It should be noted that instead of ground electrode pattern 94, an electrode pattern not set to a ground potential may be disposed between switches 54 and 55.

Shield electrode layer 95 is a metal film provided by, for example, sputtering, and covers an upper surface and side surfaces of resin component 92 and side surfaces of module substrate 91 and resin component 93. Shield electrode layer 95 is set to a ground potential and inhibits infiltration of external noise into the circuit components included in radio frequency module 1.

It should be noted that radio frequency module 1 need not include resin components 92 and 93, ground electrode pattern 94, and shield electrode layer 95. To put it another way, resin components 92 and 93, ground electrode pattern 94, and shield electrode layer 95 are not essential elements of the radio frequency module according to the present disclosure.

Post electrodes 150 are an example of external connection terminals including antenna connection terminal 100, first input terminal 111, second input terminal 112, first output terminal 121, and second output terminal 122. Post electrodes 150 are disposed on principal surface 91b of module substrate 91 and extend vertically from principal surface 91b. In addition, post electrodes 150 penetrate through resin component 93, and ends of post electrodes 150 are exposed from resin component 93. The ends of post electrodes 150 exposed from resin component 93 are connected to, for example, input-output terminals and/or ground electrodes on a mother board disposed on radio frequency module 1 in the negative direction of the z-axis.

As shown by (b) in FIG. 2, two post electrodes 150 serving as first input terminal 111 and second input terminal 112 are disposed adjacent to switch 54. Moreover, two post electrodes 150 serving as first output terminal 121 and second output terminal 122 are disposed adjacent to switch 55. Furthermore, post electrode 150 serving as antenna connection terminal 100 is disposed adjacent to switch 53. Other post electrodes 150 serve as, for example, control terminals, power terminals, or ground terminals.

[1.3 Advantageous Effects Etc.]

As described above, radio frequency module 1 according to the present embodiment includes: post electrodes 150 including at least one radio frequency input terminal and at least one radio frequency output terminal; power amplifier 11; low-noise amplifier 21; switch 54 connected between the at least one radio frequency input terminal and power amplifier 11; switch 55 connected between the at least one radio frequency output terminal and low-noise amplifier 21; and module substrate 91 including principal surface 91a and principal surface 91b on opposite sides of module substrate 91. Switch 54 is disposed on one of principal surface 91a and principal surface 91b, and switch 55 is disposed on the other of principal surface 91a and principal surface 91b.

With this configuration, it is possible to dispose circuit components on the both surfaces of module substrate 91. For this reason, it is possible to downsize radio frequency module 1 by reducing the area of module substrate 91, compared to a case in which circuit components are disposed on one surface of module substrate 91. Moreover, by disposing switch 54 connected to radio frequency input terminals 110 and switch 55 connected to radio frequency output terminals 120 on the opposite surfaces of module substrate 91, it is possible to place module substrate 91 between switches 54 and 55. Accordingly, the downsizing of radio frequency module 1 makes it possible to reduce (or suppress) deterioration of isolation characteristics between switches 54 and 55, thereby reducing (or avoiding) deterioration of NF characteristics of radio frequency module 1. In other words, radio frequency module 1 according to the present embodiment can be downsized while still avoiding a deterioration of the electrical characteristics.

Moreover, for example, post electrodes 150 may include antenna connection terminal 100, power amplifier 11 and switch 54 may be connected between antenna connection terminal 100 and the at least one radio frequency input terminal, and low-noise amplifier 21 and switch 55 may be connected between antenna connection terminal 100 and the at least one radio frequency output terminal.

With this configuration, power amplifier 11 can amplify a radio frequency signal inputted via the at least one radio frequency input terminal, and transfer the amplified radio frequency signal to antenna 2. Moreover, low-noise amplifier 21 can amplify a radio frequency signal inputted via antenna connection terminal 100, and outputs the amplified radio frequency signal to RFIC 3.

Moreover, for example, in radio frequency module 1 according to the present embodiment, switch 54 may be disposed on principal surface 91a, and switch 55 and post electrodes 150 may be disposed on principal surface 91b.

With this configuration, switch 54 can be disposed on principal surface 91a on which post electrodes 150 are not disposed, and switch 55 can be disposed on principal surface 91b on which post electrodes 150 are disposed.

Moreover, for example, in radio frequency module 1 according to the present embodiment, power amplifier 11 may be disposed on principal surface 91a, and low-noise amplifier 21 may be disposed on principal surface 91b.

With this configuration, power amplifier 1 and low-noise amplifier 21 can be disposed on the opposite surfaces of module substrate 91. Consequently, it is possible to reduce deterioration of isolation characteristics between power amplifier 11 and low-noise amplifier 21. Moreover, by disposing power amplifier 11 on principal surface 91a, it is possible to help power amplifier 11 to dissipate heat, using post electrodes 150 disposed on principal surface 91b.

Moreover, for example, radio frequency module 1 according to the present embodiment may include an electrode pattern in module substrate 91, and the electrode pattern may be disposed between switches 54 and 55.

With this configuration, the electrode pattern makes it possible to reduce magnetic field coupling, electric field coupling, or electromagnetic field coupling between switches 54 and 55, and to further reduce the deterioration of the isolation characteristics between switches 54 and 55.

Moreover, for example, in radio frequency module 1 according to the present embodiment, the electrode pattern may be ground electrode pattern 94.

With this configuration, ground electrode pattern 94 makes it possible to reduce magnetic field coupling, electric field coupling, or electromagnetic field coupling between switches 54 and 55, and to further reduce the deterioration of the isolation characteristics between switches 54 and 55.

Moreover, for example, in radio frequency module 1 according to the present embodiment, the at least one radio frequency input terminal may include radio frequency input terminals 110, and switch 54 may switch a connection of power amplifier 11 between radio frequency input terminals 110. Here, radio frequency input terminals 110 may include first input terminal 111 for receiving a 5G NR transmission signal, and second input terminal 112 for receiving an LTE transmission signal.

With this configuration, switch 54 can switch radio frequency input terminals 110, and it is possible to transmit, for example, the 5G NR transmission signal and the LTE transmission signal.

Moreover, for example, in radio frequency module 1 according to the present embodiment, the at least one radio frequency output terminal may include radio frequency output terminals 120, and switch 55 may switch a connection of low-noise amplifier 21 between radio frequency output terminals 120. Here, radio frequency output terminals 120 may include first output terminal 121 for supplying a 5G NR reception signal, and second output terminal 122 for supplying an LTE reception signal.

With this configuration, switch 55 can switch radio frequency output terminals 120, and it is possible to receive, for example, the 5G NR reception signal and the LTE reception signal.

Moreover, for example, in radio frequency module 1 according to the present embodiment, low-noise amplifier 21 and switch 55 may be implemented in same semiconductor device 20.

With this configuration, low-noise amplifier 21 and switch 55 can be integrated with one semiconductor device 20, thereby contributing to the downsizing of radio frequency module 1.

Communication device 5 according to the present embodiment includes: RFIC 3 that processes a radio frequency signal; and radio frequency module 1 that transfers a radio frequency signal between RFIC 3 and antenna 2.

With this configuration, communication device 5 can produce the same advantageous effects as radio frequency module 1.

Embodiment 2

Next, Embodiment 2 will be described. The present embodiment mainly differs from Embodiment 1 in the numbers of power amplifiers, low-noise amplifiers, radio frequency input terminals, and radio frequency output terminals. The following describes the present embodiment with reference to the drawings, mainly focusing on differences from Embodiment 1.

[2.1 Circuit Configurations of Radio Frequency Module 1A and Communication Device 5A]

Figure 4:
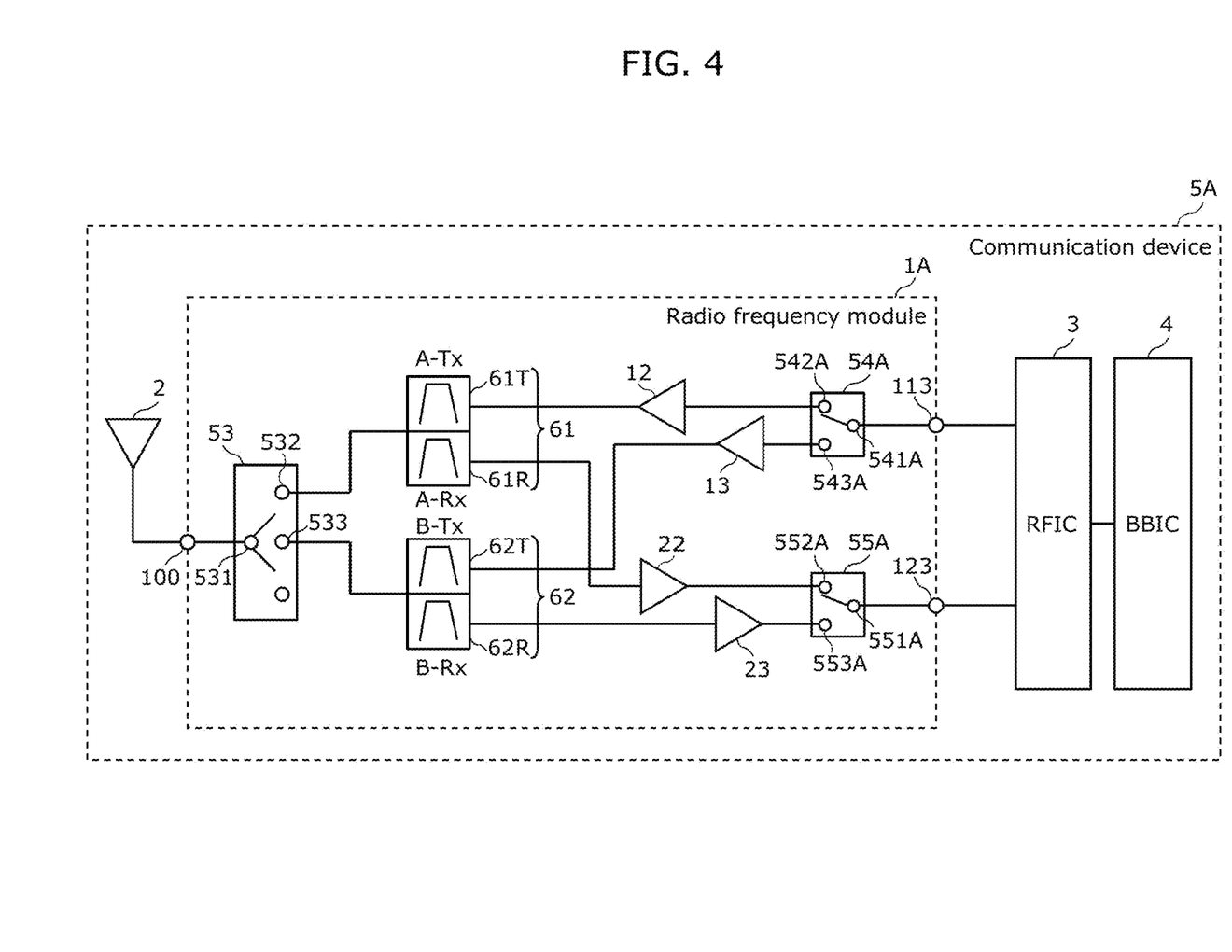
FIG. 4 is a circuit configuration diagram of a radio frequency module and a communication device according to Embodiment 2.

FIG. 4 is a circuit configuration diagram of radio frequency module 1A and communication device 5A according to Embodiment 2. As shown by FIG. 4, radio frequency module 1A according to the present embodiment includes power amplifiers 12 and 13, low-noise amplifiers 22 and 23, switches 53, 54A, and 55A, duplexers 61 and 62, antenna connection terminal 100, radio frequency input terminal 113, and radio frequency output terminal 123.

Radio frequency input terminal 113 is an example of the external connection terminal, and is a terminal for receiving radio frequency transmission signals from outside radio frequency module 1A. For example, 5G NR transmission signals or LTE transmission signals in communication bands A and B can be used as radio frequency transmission signals.

Radio frequency output terminal 123 is an example of the external connection terminal, and is a terminal for supplying radio frequency reception signals to the outside of radio frequency module 1A. For example, 5G NR reception signals or LTE reception signals in communication bands A and B can be used as radio frequency reception signals.

Power amplifiers 12 and 13 are capable of amplifying radio frequency signals received by radio frequency input terminal 113. Specifically, power amplifier 12 is capable of amplifying a radio frequency signal in communication band A inputted via switch 54A from radio frequency input terminal 113. In addition, power amplifier 13 is capable of amplifying a radio frequency signal in communication band B inputted via switch 54A from radio frequency input terminal 113. The configuration of power amplifiers 12 and 13 is not particularly limited. For example, power amplifiers 12 and 13 may each be a multistage amplifier, or an amplifier that converts a radio frequency signal into a differential signal and amplifies the differential signal.

Low-noise amplifiers 22 and 23 are capable of amplifying radio frequency signals received by antenna connection terminal 100. Specifically, low-noise amplifier 22 is capable of amplifying a radio frequency signal in communication band A inputted via switch 53 and duplexer 61 from antenna connection terminal 100. The radio frequency signal in communication band A amplified by low-noise amplifier 22 is outputted via switch 55A to radio frequency output terminal 123. Similarly, low-noise amplifier 23 is capable of amplifying a radio frequency signal in communication band B inputted via switch 53 and duplexer 62 from antenna connection terminal 100. The radio frequency signal in communication band B amplified by low-noise amplifier 23 is outputted via switch 55A to radio frequency output terminal 123.

Switch 54A is an example of the first switch and is connected between radio frequency input terminal 113 and power amplifiers 12 and 13. Specifically, switch 54A includes terminals 541A, 542A, and 543A. Terminal 541A of switch 54A is connected to radio frequency input terminal 113. Terminals 542A and 543A of switch 54A are connected to power amplifiers 12 and 13, respectively. In this connection configuration, switch 54A is capable of connecting one of terminals 542A and 543A to terminal 541A, based on a control signal from RFIC 3, for example. In other words, switch 54A is capable of switching between connecting radio frequency input terminal 113 and power amplifier 12 and connecting radio frequency input terminal 113 and power amplifier 13. Switch 54A is configured of, for example, an SPDT switch circuit and is referred to as a transmission input switch.

Switch 55A is an example of the second switch and is connected between radio frequency output terminal 123 and low-noise amplifiers 22 and 23. Specifically, switch 55A includes terminals 551A, 552A, and 553A. Terminal 551A of switch 55A is connected to radio frequency output terminal 123. Terminals 552A and 553A of switch 55A are connected to low-noise amplifiers 22 and 23, respectively. In this connection configuration, switch 55A is capable of connecting one of terminals 552A and 553A to terminal 551A, based on a control signal from RFIC 3, for example. In other words, switch 55A is capable of switching between connecting radio frequency output terminal 123 and low-noise amplifier 22 and connecting radio frequency output terminal 123 and low-noise amplifier 23. Switch 55A is configured of, for example, an SPDT switch circuit and is referred to as a reception output switch.

It should be noted that radio frequency module 1A need not include some of the circuit elements shown by FIG. 4. For example, radio frequency module 1A may include at least power amplifiers 12 and 13, low-noise amplifiers 22 and 23, switches 54A and 55A, radio frequency input terminal 113, and radio frequency output terminal 123. Radio frequency module 1A need not include the other circuit elements.

Since radio frequency module 1A thus configured has the same layout of the circuit components as radio frequency module 1 according to Embodiment 1, illustration and description thereof is omitted.

[2.2 Advantageous Effects Etc.]

As described above, radio frequency module 1A according to the present embodiment may include power amplifiers 12 and 13, and switch 54A may switch a connection of radio input terminal 113 between power amplifiers 12 and 13.

With this configuration, switch 54A is capable of switching power amplifiers 12 and 13, and it is possible to improve, for example, isolation characteristics between communication bands A and B.

Moreover, for example, radio frequency module 1A according to the present embodiment may include low-noise amplifiers 22 and 23, and switch 55A may switch a connection of radio frequency output terminal 123 between low-noise amplifiers 22 and 23.

With this configuration, switch 55A is capable of switching low-noise amplifiers 22 and 23, and it is possible to improve, for example, isolation characteristics between communication bands A and B.

Embodiment 3

Next, Embodiment 3 will be described. The present embodiment mainly differs from Embodiment 1 in the numbers of power amplifiers and low-noise amplifiers. The following describes the present embodiment with reference to the drawings, mainly focusing on differences from Embodiments 1 and 2.

[3.1 Circuit Configurations of Radio Frequency Module 1B and Communication Device 5B]

Figure 5:
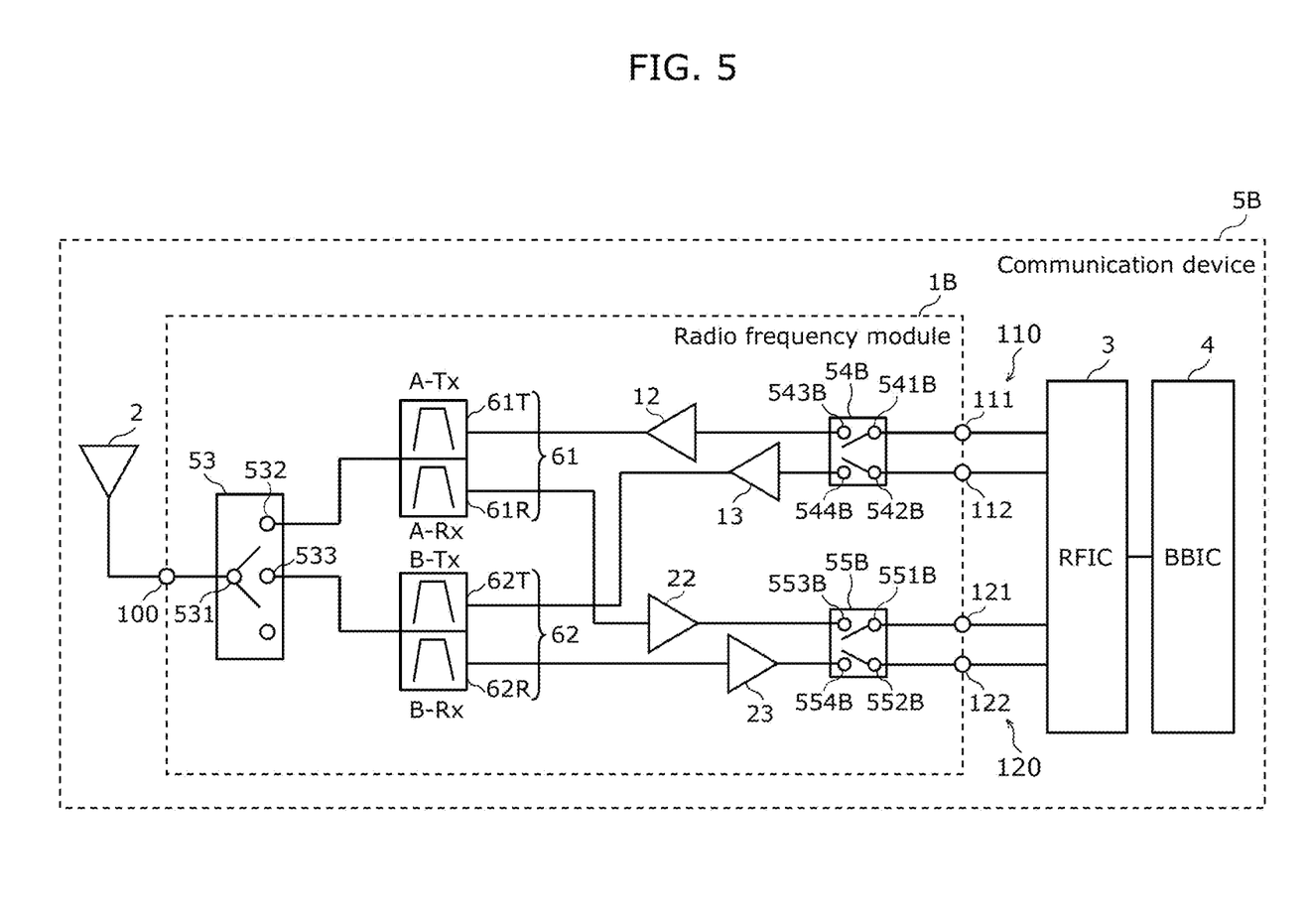
FIG. 5 is a circuit configuration diagram of a radio frequency module and a communication device according to Embodiment 3.

FIG. 5 is a circuit configuration diagram of radio frequency module 1B and communication device 5B according to Embodiment 3. As shown by FIG. 5, radio frequency module 1B according to the present embodiment includes power amplifiers 12 and 13, low-noise amplifiers 22 and 23, switches 53, 54B, and 55B, duplexers 61 and 62, antenna connection terminal 100, radio frequency input terminals 110, and radio frequency output terminals 120.

Switch 54B is an example of the first switch and is connected between radio frequency input terminals 110 and power amplifiers 12 and 13. Specifically, switch 54B includes terminals 541B, 542B, 543B, and 544B. Terminals 541B and 542B of switch 54B are connected to first input terminal 111 and second input terminal 112, respectively. Terminals 543B and 544B of switch 54B are connected to power amplifiers 12 and 13, respectively. In this connection configuration, switch 54B is capable of connecting one of terminals 541B and 542B and terminal 543B, and connecting the other of terminals 541B and 542B and terminal 544B, based on a control signal from RFIC 3, for example. In other words, switch 54B is capable of switching a connection of each of power amplifiers 12 and 13 between radio frequency input terminals 110. Switch 54B is configured of, for example, a multi-connection switch circuit and is referred to as a transmission input switch.

Switch 55B is an example of the second switch and is connected between radio frequency output terminals 120 and low-noise amplifiers 22 and 23. Specifically, switch 55B includes terminals 551B, 552B, 553B, and 554B. Terminals 551B and 552B of switch 55B are connected to first output terminal 121 and second output terminal 122, respectively. Terminals 553B and 554B of switch 55B are connected to low-noise amplifiers 22 and 23, respectively. In this connection configuration, switch 55B is capable of connecting one of terminals 551B and 552B and terminal 553B, and connecting the other of terminals 551B and 552B and terminal 554B, based on a control signal from RFIC 3, for example. In other words, switch 55B is capable of switching a connection of each of low-noise amplifiers 22 and 23 between radio frequency output terminals 120. Switch 55B is configured of, for example, a multi-connection switch circuit and is referred to as a transmission output switch.

Since radio frequency module 1B thus configured has the same layout of the circuit components as radio frequency module 1 according to Embodiment 1, illustration and description thereof is omitted.

[3.2 Advantageous Effects Etc.]

As described above, radio frequency module 1B according to the present embodiment may include radio frequency input terminals 110 and power amplifiers 12 and 13, and switch 54B may switch a connection of each of power amplifiers 12 and 13 between radio frequency input terminals 110.

With this configuration, switch 54B is capable of switching a connection of each of power amplifiers 12 and 13 between radio frequency input terminals 110, and it is possible to transmit radio frequency signals simultaneously using power amplifiers 12 and 13.

Moreover, for example, radio frequency module 1B according to the present embodiment may include radio frequency output terminals 120 and low-noise amplifiers 22 and 23, and switch 55B may switch a connection of each of low-noise amplifiers 22 and 23 between radio frequency output terminals 120.

With this configuration, switch 55B is capable of switching a connection of each of low-noise amplifiers 22 and 23 between radio frequency output terminals 120, and it is possible to transmit radio frequency signals simultaneously using low-noise amplifiers 22 and 23.

Embodiment 4

Next, Embodiment 4 will be described. The present embodiment mainly differs from Embodiments 1 to 3 in that a radio frequency module includes bump electrodes instead of post electrodes. The following describes the present embodiment with reference to the drawings, mainly focusing differences from Embodiments 1 to 3.

It should be noted that a circuit configuration of radio frequency module 1C according to the present embodiment is the same as that described in any of Embodiments 1 to 3, illustration and description thereof is omitted.

[4.1 Component Layout of Radio Frequency Module 1C]

Figure 6:
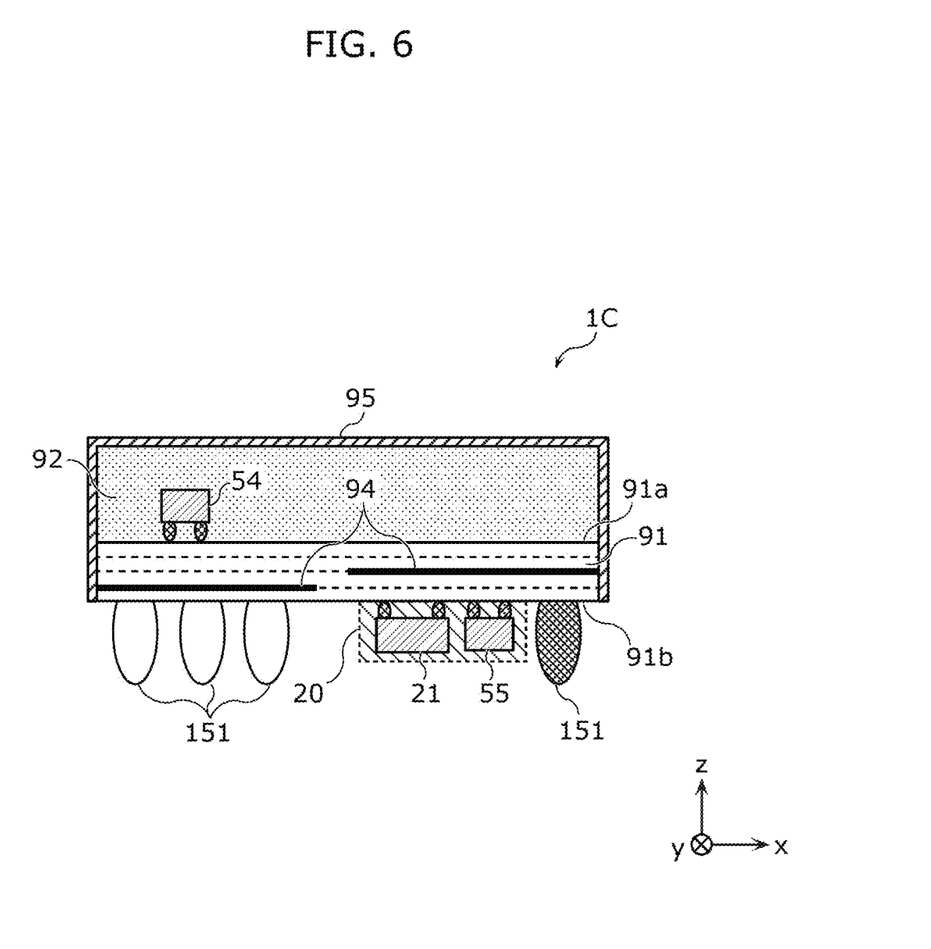
FIG. 6 is a cross-sectional view of a radio frequency module according to Embodiment 4.

FIG. 6 is a cross-sectional view of radio frequency module 1C according to Embodiment 4. As shown by FIG. 6, radio frequency module 1C according to the present embodiment includes bump electrodes 151 instead of post electrodes 150. Moreover, in the present embodiment, radio frequency module 1C need not include resin component 93 on a principal surface 91b side.

[4.2 Advantageous Effects Etc.]

As described above, radio frequency module 1C according to the present embodiment may include bump electrodes 151 as external connection terminals.

Even in this case, radio frequency module1C is capable of producing the same advantageous effects as Embodiments 1 to 3.

Other Embodiments

Although the radio frequency modules and the communication devices according to the present disclosure have been described based on the aforementioned embodiments, the radio frequency modules and the communication devices according to the present disclosure are not limited to the aforementioned embodiments. The present disclosure includes other embodiments achieved by combining any of the elements in the aforementioned embodiments, variations resulting from various modifications to the aforementioned embodiments that may be conceived by those skilled in the art without departing from the essence of the present disclosure, and various devices that contain the radio frequency modules and the communication devices.

For example, in the circuit configurations of the radio frequency module and the communication device according to each of the aforementioned embodiments, any circuit element, any line, etc. may be inserted in a path connecting the circuit elements and signal paths disclosed by the figures. For example, in Embodiment 1, an impedance matching circuit may be inserted between switch 53 and duplexer 61, between switch 53 and duplexer 62, between switch 51 and power amplifier 11, between switch 52 and low-noise amplifier 21, or may be inserted between one, two, three, or all of those.

It should be noted that the component layout in each of the aforementioned embodiments is an example, and the present disclosure is not limited to this example. For example, in Embodiment 1, switch 54 and switch 55 may be disposed on principal surface 91b and principal surface 91a, respectively. Even in such a case, since switches 54 and 55 can be disposed on the opposite surfaces of module substrate 91, it is possible to downsize radio frequency module 1 while reducing deterioration of electrical characteristics of radio frequency module 1.

Although only some exemplary embodiments of the present disclosure have been described in detail above, those skilled in the art will readily appreciate that many modifications are possible in the exemplary embodiments without materially departing from the novel teachings and advantages of the present disclosure. Accordingly, all such modifications are intended to be included within the scope of the present disclosure.

INDUSTRIAL APPLICABILITY

The present disclosure can be widely used in communication apparatuses such as a mobile phone, as a radio frequency module disposed in a front end part.

The invention claimed is:

1. A radio frequency module, comprising:
a plurality of external connection terminals including at least one input terminal and at least one output terminal;
at least one power amplifier;
at least one law-noise amplifier;

a first switch connected between the at least one input terminal and the at least one power amplifier;
a second switch connected between the at least one output terminal and the at least one low-noise amplifier; and
a module substrate including a first principal surface and a second principal surface on opposite sides of the module substrate, wherein
the first switch is disposed on one of the first principal surface and the second principal surface, and the second switch is disposed on the other of the first principal surface and the second principal surface, and
the at least one power amplifier is disposed on the first principal surface and the at least one low-noise amplifier is disposed on the second principal surface to reduce deterioration of isolation characteristics between the at least one power amplifier and the at least one low-noise amplifier.

2. The radio frequency module according to claim 1, wherein
the plurality of external connection terminals comprise an antenna connection terminal,
the at least one power amplifier and the first switch are connected between the antenna connection terminal and the at least one input terminal, and
the at least one low-noise amplifier and the second switch are connected between the antenna connection terminal and the at least one output terminal.

3. The radio frequency module according to claim 1, wherein
the first switch is disposed on the first principal surface, and
the second switch and the plurality of external connection terminals are disposed on the second principal surface.

4. The radio frequency module according to claim 1, wherein
the radio frequency module includes an electrode pattern in the module substrate, and
the electrode pattern is disposed between the first switch and the second switch.

5. The radio frequency module according to claim 4, wherein
the electrode pattern is a ground electrode pattern.

6. The radio frequency module according to claim 1, wherein
the at least one input terminal comprises a plurality of input terminals, and
the first switch is configured to controllably switch a connection of the at least one power amplifier between the plurality of input terminals.

7. The radio frequency module according to claim 6, wherein
the plurality of input terminals comprise a first input terminal configured to receive a Fifth Generation New Radio (5G NR) transmission signal, and a second input terminal configured to receive a Long-Term Evolution (LTE) transmission signal.

8. The radio frequency module according to claim 1, wherein
the at least one output terminal comprises a plurality of output terminals, and
the second switch is configured to controllably switch a connection of the at least one low-noise amplifier between the plurality of output terminals.

9. The radio frequency module according to claim 8, wherein
the plurality of output terminals comprise a first output terminal configured to supply a Fifth Generation New Radio (5G NR) reception signal, and a second output terminal configured to supply a Long-Term Evolution (LTE) reception signal.

10. The radio frequency module according to claim 1, wherein
the at least one power amplifier comprises a plurality of power amplifiers, and
the first switch is configured to controllably switch a connection of the at least one input terminal between the plurality of power amplifiers.

11. The radio frequency module according to claim 1, wherein
the at least one low-noise amplifier comprises a plurality of low-noise amplifiers, and
the second switch is configured to controllably switch a connection of the at least one output terminal between the plurality of low-noise amplifiers.

12. The radio frequency module according to claim 1, wherein
the at least one low-noise amplifier and the second switch are implemented in a same semiconductor device.

13. A communication device, comprising:
a signal processing circuit that processes a radio frequency signal; and
a radio frequency module that transfers a radio frequency signal between the signal processing circuit and an antenna, wherein
the radio frequency module includes:
a plurality of external connection terminals including at least one input terminal and at least one output terminal;
at least one power amplifier;
at least one low-noise amplifier;
a first switch connected between the at least one input terminal and the at least one power amplifier;
a second switch connected between the at least one output terminal and the at least one low-noise amplifier; and
a module substrate including a first principal surface and a second principal surface on opposite sides of the module substrate,
the first switch is disposed on one of the first principal surface and the second principal surface, and the second switch is disposed on the other of the first principal surface and the second principal surface, and
the at least one power amplifier is disposed on the first principal surface and the at least one low-noise amplifier is disposed on the second principal surface to reduce deterioration of isolation characteristics between the at least one power amplifier and the at least one low-noise amplifier.

14. The communication device according to claim 13, wherein
the plurality of external connection terminals comprise an antenna connection terminal,
the at least one power amplifier and the first switch are connected between the antenna connection terminal and the at least one input terminal, and
the at least one low-noise amplifier and the second switch are connected between the antenna connection terminal and the at least one output terminal.

15. The communication device according to claim 13, wherein
the first switch is disposed on the first principal surface, and
the second switch and the plurality of external connection terminals are disposed on the second principal surface.

16. The communication device according to claim 13, wherein
the radio frequency module includes an electrode pattern in the module substrate, and
the electrode pattern is disposed between the first switch and the second switch.

17. The communication device according to claim 16, wherein
the electrode pattern is a ground electrode pattern.

18. The communication device according to claim 13, wherein
the at least one low-noise amplifier and the second switch are implemented in a same semiconductor device.

19. A radio frequency module, comprising:
a plurality of external connection terminals including at least one input terminal and at least one output terminal;
at least one power amplifier;
at least one low-noise amplifier;
a first switch connected between the at least one input terminal and the at least one power amplifier;
a second switch connected between the at least one output terminal and the at least one low-noise amplifier; and
a module substrate including a first principal surface and a second principal surface on opposite sides of the module substrate, wherein
the at least one power amplifier is disposed on one of the first principal surface and the second principal surface and the at least one low-noise amplifier is disposed on the other of the first principal surface and the second principal surface to reduce deterioration of isolation characteristics between the at least one power amplifier and the at least one low-noise amplifier.

* * * * *